United States Patent [19]
Haner

[11] Patent Number: 6,108,488
[45] Date of Patent: Aug. 22, 2000

[54] SPEED CONTROL SYSTEM FOR REPULSION MOTOR

[76] Inventor: Lambert Haner, 1975 Wynwood Dr., Rocky River, Ohio 44116

[21] Appl. No.: 09/248,498

[22] Filed: Feb. 10, 1999

Related U.S. Application Data

[63] Continuation-in-part of application No. 08/919,537, Aug. 28, 1997, Pat. No. 5,936,374, which is a continuation of application No. 08/535,339, Sep. 28, 1995, Pat. No. 5,686,805, which is a continuation of application No. 08/305,575, Sep. 14, 1994, Pat. No. 5,491,398, which is a continuation of application No. 08/037,246, Mar. 26, 1993, Pat. No. 5,424,625.

[51] Int. Cl.[7] ....................................................... H02P 5/28
[52] U.S. Cl. ........................ 388/811; 318/725; 318/254; 318/138; 318/439; 318/724; 318/700; 318/720; 318/721; 318/726
[58] Field of Search .................................... 318/725, 254, 318/138, 439, 724, 700, 720, 721, 726; 388/811

[56] References Cited

U.S. PATENT DOCUMENTS 5,686,805  11/1997  Haner .
5,767,601   6/1998  Uchiyam .................................. 318/725

*Primary Examiner*—Karen Masih
*Attorney, Agent, or Firm*—Vickers, Daniels & Young

[57] ABSTRACT

A speed control system for a brushless repulsion motor of the type including a series of armature mounted switches for shorting circumferentially spaced armature coils, said system comprising: a digital counter on the armature for creating a repetitive succession of switch activating signals in a selected sequence at a given rate determined by the counting rate of the counter; means for activating the switches with the signals in the sequence and at the rate to control the speed of the armature; and, means for directing a reference pulse signal at a reference frequency to the counter to set the counting rate of the counter.

58 Claims, 11 Drawing Sheets

SPEED CONTROL SYSTEM FOR REPULSION MOTOR

This application is a continuation-in-part of application Ser. No. 08/919,537, filed Aug. 28, 1997, now U.S. Pat. No. 5,936,374, which is in turn a continuation of application Ser. No. 08/535,339, filed Sep. 28, 1995, now U.S. Pat. No. 5,686,805, which is a continuation of application Ser. No. 08/305,575, filed Sept. 14, 1994, now U.S. Pat. No. 5,491,398, which is a continuation of application Ser. No. 08/037,246, filed Mar. 26, 1993, now U.S. Pat. No. 5,424,625.

The present invention relates to a brushless repulsion motor and more particularly to a speed control system and a method of controlling the speed of a brushless repulsion motor.

INCORPORATION BY REFERENCE

A brushless repulsion motor is a motor including a series of armature mounted switches for shorting circumferentially spaced armature coils when the coils reach a particular angle with respect to the flux of the motor. Normally each coil includes a detector for shorting the coils at the predetermined angular position. Such a brushless repulsion motor is shown in Haner U.S. Pat. No. 5,686,805, incorporated by reference herein. Details of the operation of a brushless repulsion motor are known in the art as disclosed in this United States patent.

BACKGROUND OF THE INVENTION

A repulsion motor has certain advantageous characteristics; however, it has been found that the brushless repulsion motor has a speed/torque operating curve where the speed of the armature is determined by the torque applied to the armature. Consequently, when a set speed for a range of torques is desired, a standard repulsion motor must be modified to provide a controlled speed. Such speed control for repulsion motors has been quite complex and involves shifting the repulsion motor into another mode of operation, which is quite complex and expensive. This disadvantage prevents the fill realization of the tremendous improvement accomplished by a brushless version of a repulsion motor, as disclosed in Haner U.S. Pat. No. 5,686,805.

STATEMENT OF INVENTION

The development of a brushless version of a repulsion motor has been further improved by a control system whereby the repulsion motor can be directly connected to a 60 Hz AC power source and operated over a controlled speed range of 0 to 2000 or so rpm. The armature speed can be set at any point in the control range and adjusted during operation of the brushless repulsion motor. The speed regulation circuit or system of the present invention is contained on the armature itself, as are the switches used in shorting the coils of the repulsion motor. Consequently, there is no need for brushes to communicate information form the stator to the rotor of the motor. The invention does not require a tachometer feedback in a closed loop operation. By using the present invention, the brushless repulsion motor now has substantially the same speed/torque characteristics of a classic shunt wound DC motor. The advantage of using the present invention over a shunt wound DC motor is that the new brushless repulsion motor does not require a mechanical commutator, brushes and brush holders, compensation windings, rectifier and power supply for the field itself, electronic power controls for converting AC line voltage to DC power and a tachometer feedback for the speed regulation. The brushless repulsion motor to which the invention is directed does not require the interpoles or compensating poles (compoles) that are necessary in the classical DC motors to neutralize the field in the brush/commutator region. The interpoles are used in the classical DC motors to reduce sparking between the brushes and commutator. Thus, even though the new brushless repulsion motor has characteristics of a shunt wound DC motor, it does not have the expense and complexity necessary for such DC motor. In addition, a brushless repulsion motor using the speed control system and/or method of the present invention can be directly connected to the AC power line, which feature is not possible with a shunt wound DC motor. The DC motor requires a converter driven by a rectifier. Consequently, the brushless repulsion motor using the speed control of the present invention has better performance characteristics than a shunt wound DC motor and is much less expensive to build and install than such DC motor. Indeed, the present invention has advantages over the classic induction motor/inverter system used in the prior art. The brushless repulsion motor using the speed control system and/or method of the present invention incorporates the basic mechanical structures of a DC motor, but with different windings and no commutator. By merely employing a simple digital electronics package on the armature itself, the speed control of the present invention is obtained. By using the present invention, the stall/startup current is less than twice the full load run current. In addition, the brushless motor of the present invention has current limiting as an inherent characteristic and the shorting switches of the coils are mounted on a disk that rotates with the armature which greatly enhances the cooling action of the rotating power switches used in the brushless repulsion motor.

By using the present invention, the brushless repulsion motor has a speed that is controlled by the sequencing of the power switches on the armature. The switching rate is established by a frequency generated by an oscillator built on the armature. The frequency is adjusted by a potentiometer located in a circuit mounted on the armature. Consequently, a change in the speed of the motor merely involves changing the potentiometer setting on the armature. However, in using this basic concept of the invention, the armature must be stopped to adjust the armature speed. In accordance with another aspect of the invention, a remote mechanism on the stator is used to change or adjust the frequency of the switch operations, thereby eliminating the potentiometer mounted on the armature and allowing the speed of the armature to be adjusted from an external fixed location. The speed can be changed while the motor is operating. Such remote control can be accomplished by a variety of arrangements. In accordance with the preferred embodiment of this aspect of the invention, an array of LED markers is provided as an inexpensive addition to accomplish remote speed control. Photologic detectors on the armature are used to detect pulsed frequency of the LED markers. The output of these detectors is used to operate the counter that triggered the power switches mounted on the armature. The pulsed output signal from each detector as it passes the pulsing LED markers creates a frequency signal dictated by pulsation of the LED markers. The pulses of the markers are detected on the armature and become the reference or speed control frequencies to adjust then set armature speed of the motor. By this arrangement, there is no need for an oscillator on the armature. The pulses are detected and used for controlling the sequence of the coil shorting power switches. An external oscillator drives the LED array for transmitting a pulsating speed signal to the armature. Indeed, the arrays can be pulsed by an externally mounted oscillator or by a separate pulsating frequency source. By using this external source, it is possible to synchronize the speed of the brushless repulsion motor employed in the present invention with the speed of another device driven by a pulsating signal or creating a pulsation signal. In this manner, the speed of the brushless repulsion motor can be synchronized with other motors or other motion generating equipment.

Whether the speed control signal is generated by an oscillator on the armature, an oscillator on the stator of the motor, or an external synchronization signal, the brushless repulsion motor provides a speed/torque curve that is similar to that produced by a shunt wound DC motor. The basic aspect of the invention is a simple electronic speed control circuit that is placed onto the armature together with the electronic power switches for shorting the coils of the brushless repulsion motor so that the electronic control circuit forces the motor to produce an operating curve similar to the operating curve of a shunt wound DC motor. The use of the present invention will hold the motor speed constant up to the rated torque of the motor for the particular set speed. Beyond this rated torque for a set speed, the armature speed will decrease with a negative slope as more torque is applied until the motor speed falls to zero. At this point the motor develops its maximum torque. The rated torque point is the level of torque produced at a given speed along the speed/torque curve of the motor. The regulated armature speed of the present invention can be preset at a value by simply varying the set point speed of the control system. The speed variation is accomplished on the armature itself or from a remote position in accordance with an embodiment of the invention.

The basic concept of the present invention is the use of a digital counter on the armature for creating a repetitive succession of switch activating signals in a selected sequence at a given rate determined by the counting rate of the counter, with means for actuating the power switches for shorting the individual coils at preselected armature positions by signals from the counter and in the sequence of the counter signals and at the rate of the counter signal. Thus the digital counter controls the speed of the armature. The operation of the invention allows each coil shorting power switch to be shifted into conduction in a sequence at a rate determined by the counting rate of the counter output signals. To enhance performance, by lowering torque ripple and increasing the efficiency, the power switches are operated in sequence by the counter with a logic pattern where two switches are activated to short two coils at a time. For example, with eight coils, the switches are stepped in overlapping pairs. Coils 1 and 2 are shorted, then coil 1 is opened and coil 3 is closed. This process is repeated around the armature. This is done by a logic network at the output of the counter to sequence the switches. In this process the switches are still activated in succession. However, in the preferred implementation, only one signal occurs at a time in a manner similar to a ring counter. In a situation where there are eight switches, the digital counter will have eight output stages to distribute the trigger signals to each switch in sequence. Assume that the oscillator is set to deliver 480 pulses per second to the triggered output terminals of the counter. Each power switch is triggered into conduction in sequence at a rate of 60 times per second. By using a ring type counter, only a single switch would be conductive at a given time. Each switch must turn on twice for a single revolution of the armature. Thus, the armature speed would be 30 revolutions per second, or 1800 RPM. If it is assumed that the brushless repulsion motor is running at 1800 RPM and there is no torque load on the motor, the power switch that is being switched on relative to the position of the coil controlled by the switch will be at a given location. Under a no load torque condition, the position of the switch and the coil is nearly in line with the pole axis of the motor. The motor armature is rotating at 1800 RPM in the clockwise direction. The power switches are switching the various coils in sequence, which sequence rotates counterclockwise at the same rate that the armature is rotating clockwise. Consequently, each coil is activated in the same phase position relative to the pole axis of the motor. With eight coils, there are 16 slots. This provides one slot every 25.5°. If the motor had only four windings, which is used in the preferred embodiment of the present invention, the slots would occur every 45°. At 1800 RPM, the armature rotates 22.5° in the clockwise direction in $1/480$ seconds. Since the output of the counter is at 480 pulses per second, the interval between switching signals is $1/480$ seconds. Each time the armature rotates 22.5°, the next switch is closed to short its coil by a signal from the counter. This process continues to control the speed of the armature. As the load torque is increased on the armature, the motor will attempt to slow down. This causes the armature to rotate at a speed which is slightly less than 1800 RPM for an instant of time. Since the output of the counter is at a constant rate, the angle of the switches used to short the individual coils shifts slightly in a counterclockwise direction. As this process continues, the torque angle of the motor increases. This increase of the developed torque angle will eventually balance the load torque, at which time the speed will no longer tend to decrease and the motor will once again be running at exactly 1800 RPM. When the torque on the armature is removed, the reverse corrective action occurs, whereby the armature speed tends to increase for an instant of time until the angular position of the shorted coil is closer to the pole axis. By creating a series of switching signals at a controlled rate, the speed of the armature in the brushless repulsion motor is held constant. The speed can be adjusted by changing the counting frequency as explained in this example.

In accordance with aspect of the invention, the increase in torque angle caused by a slight decrease in the armature speed controls the speed of the armature until the torque angle reaches the maximum capacity of the motor at a selected speed. At that instant, the invention employs the concept of shifting the speed/torque curve of the motor to a speed/torque curve where the speed decreases with the increased torque. This shift is accomplished by the use of an energy transmitting reference marker at a fixed rotational position with respect to the field of the motor. This marker is at an adjusted position where the motor will develop its maximum torque for a particular speed. In that instance, if the load torque increases still further, the motor speed must be lowered to supply additional torque. Otherwise, the repulsion motor will stall. The invention utilizes the reduction in the rate of the switching signals when the maximum torque angle for a given speed has been reached. In a preferred embodiment, the input pulse rate into the counter itself is diminished by an inhibit signal. Once this inhibit signal occurs, the additional torque on the armature will reduce the speed of the armature. The speed will decrease. However, if the torque decreases, the counting rate will increase until it again reaches the controlled speed to, thus, bring the armature speed back toward the set point which in the example is 1800 RPM. The reference marker used in this aspect of the invention is an infrared LED array. Each coil of the armature has an associated photodetector that is activated by the LED array when the coil associated with the detector is in line with the external marker. A simple logic circuit compares the output state of the pulses from the counter for any particular coil with the output rate of the corresponding photodetector of the same coil. If the switching pulse for a coil shorting switch occurs at the same time as a detector signal occurs for the same coil, a coincidence circuit inhibits the input pulses to the counter. The counter will not sequence to trigger the next switch. This circuit causes the armature to decrease in speed. The counter inhibit will continue until the armature speed has been lowered sufficiently to increase the torque. The motor will continue to run at a lower speed to balance the torque with the speed. However, when this load on the armature is reduced, the speed of the armature will increase back to the preset control speed.

At start-up the counter will advance to the count state that is coincidence with the reference marker or LED array, so that a maximum torque is created at start-up. The inhibit function prevents the counter from advancing beyond this coincidence point until the armature begins to rotate. As the armature accelerates toward the controlled set speed, the inhibit function of the invention continues to synchronize the position of the shorted coil with position of the external reference marker. When the motor is running at the desired set speed, it is operating as a synchronous motor. Of course, the set speed is adjusted by changing the switch trigger rate from the counter, which rate is normally produced by an oscillator having a pulse signal directed to the counter. By using the invention, the speed of the motor is brought up to the set speed determined by the normal output signal sequencing of the counter. This speed is held until a maximum torque angle is necessary to maintain the speed. At that time, the output signals from the counters for triggering the coil shorting switches are inhibited to reduce the armature speed whereby the repulsion motor operates on an angular portion of the speed/torque curve.

In accordance with the present invention, there is provided a speed control system for a brushless repulsion motor of a type including a series of armature mounted switches for shorting circumferentially spaced armature coils. This system comprises a digital counter on the armature for creating a repetitive succession of switch actuating signals in a selected sequence at a given rate determined by the counting rate of the counter and means for activating the coil shorting switches with the signals for the counter in the sequence and at the rate to control the speed of the armature. By directing a reference pulse signal at a reference frequency to the counter to set the counting rate of the counter, the armature speed of the motor is controlled. The counting rate of the counter can either be a reference frequency or the difference between a reference frequency and a frequency indicative of the actual rotational speed of the armature.

In accordance with an aspect of the invention, the digital counter is up/down counter with an up count input and a down count input. A pulse signal, representative of the armature speed, is directed to one input and a reference pulse signal is directed to the other input. In this fashion, the output of the counter, which sequences the switching output signals, is determined by the difference between the two input pulsing signals to the counter. By reversing the inputs of the up/down counter, the rotational direction of the repulsion motor is reversed.

In accordance with another aspect of this invention, the reference frequency to the counter is the output of a voltage-controlled oscillator, which v/f oscillator is located preferably on the armature but, alternatively, on the stator of the motor.

In accordance with another aspect of the invention, a position signal emitting device fixed at a given position with respect to the rotating armature emits a pulsating signal toward the armature. A series of detectors, each associated with an armature mounted coil respond to the emitted signal. When one of the detectors receives the emitted signal at the same time its associated armature mounted coil is shorted a coincidence signal is generated. This coincidence signal creates an inhibitive signal to inhibit further sequencing of the digital counter. The counter does not advance the switching position. This inhibits the counter output signals used for shorting the armature coils to cause the motor to shift into normal decreasing speed/torque curve. The same inhibit signal is used at the start-up of the motor for bringing the stall torque into play for advancing the armature toward the preselected set speed.

In accordance with another aspect of the present invention, there is provided a speed control method for a brushless repulsion motor of the type including a series of armature mounted switches for shorting the circumferentially spaced armature coils. This method involves creating a repetitive succession of switch activated signals in a selected sequence at a given rate and activating the switches with the signals in the sequence and at the rate to control the speed of the armature. In accordance with another aspect of the method, there is provided an additional step of changing the given rate to change the set speed of the repulsion motor. Further, another aspect of the method is the creation of a coincidence signal when one of the armature mounted coils is shorted at a given position in the rotation of the armature, so the switch activating signals are inhibited upon the creation of a coincidence signal. The direction of the sequencing of the signals can be changed to reverse the direction of the repulsion motor.

As another aspect of the invention, there is provided a speed control system for a brushless repulsion motor of the type including a series of armature mounted switches for shorting circumferentially spaced armature coils. This system includes means for creating a repetitive succession of switch activating signals and a selected sequence at a given rate and activating the switches with the signals in the sequence and at the rate to control the speed of the armature. This improves the characteristics of the brushless repulsion motor which has the advantages of not requiring a commutator brush mechanism. Upon sensing a decrease in the armature speed below the controlled speed, the switch activating signals are inhibited to convert the operating characteristics of the brushless repulsion motor.

The primary object of the present invention is the provision of a speed control system and/or method for use on a brushless repulsion motor of the type disclosed in Haner U.S. Pat. No. 5,686,805, which speed control system and method causes the repulsion motor to operate generally with the characteristics of a shunt wound DC motor without the complexities of such a motor.

Another object of the present invention is the provision of a speed control system and method, as defined above, which system and method does not require mechanical connection between the armature and stator of the repulsion motor and is inexpensive to apply in a brushless repulsion motor as disclosed in Haner U.S. Pat. No. 5,686,805.

Yet another object of the present invention is the provision of a control system and method, as defined above, which method and system allows adjustment of the control speed for a brushless repulsion motor, which speed is held constant until the maximum torque for a given speed is reached.

Still a further object of the present invention is the provision of a system and method, as defined above, which system and method employs a pulse signal with a given frequency for controlling the speed of a brushless repulsion motor, whereby the speed can be changed by changing the frequency of the pulse signal. In addition, the system and method can be used to reverse the direction of the repulsion motor and can use a frequency generating oscillator mounted on the armature or remote from the armature.

Another object of the present invention is the provision of a system and method, as defined above, which system and method utilizes an oscillator driving a counter which provides switching signals in sequence to short, sequentially, the circumferentially located coils on the armature of the motor, with a marker to create a coincidence signal when the maximum torque angle of the motor has been reached to reduce the rate of the switching signals. Thus, the speed of the motor is controlled by the frequency or rate of the switching pulses and the rotational direction of the motor is controlled by the sequencing of the switching signals.

These and other objects and advantages will become apparent from the following description taken together with the accompanying drawings.

PREFERRED EMBODIMENT

Figure 1:
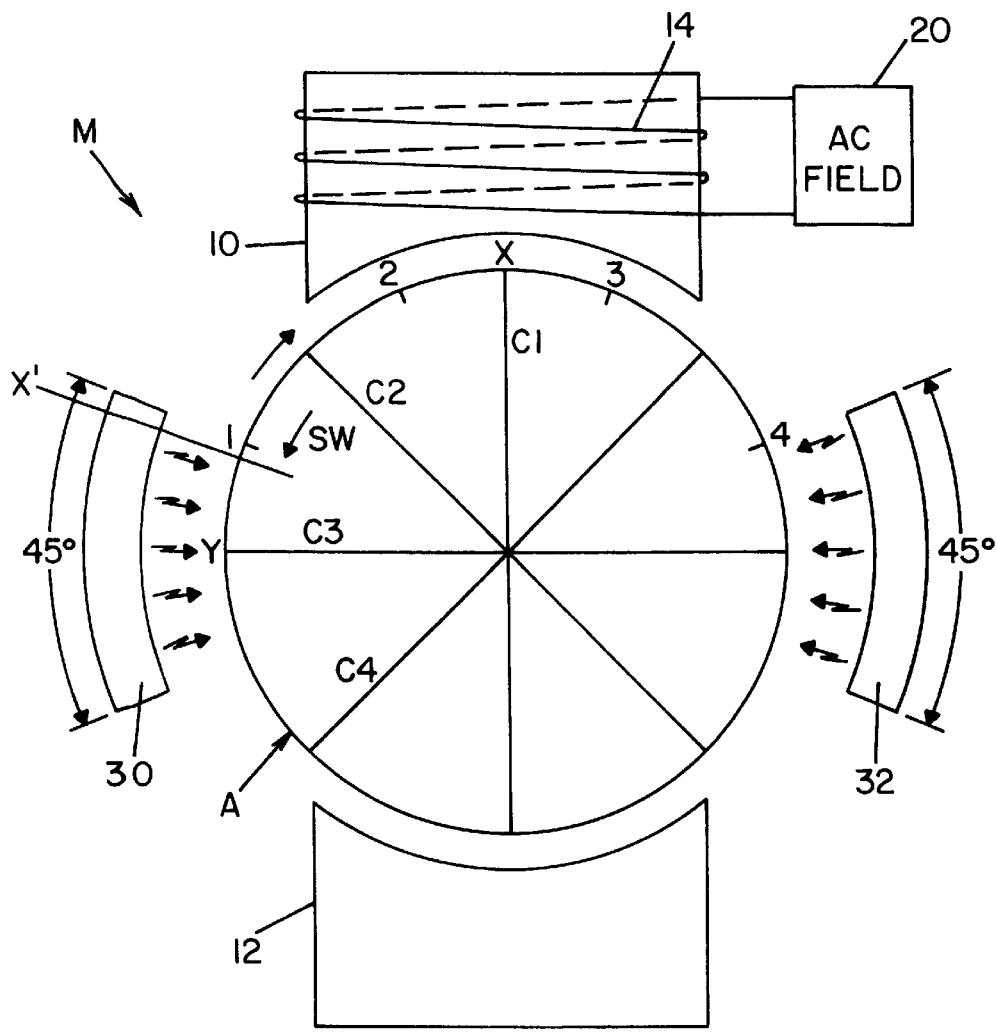
FIG. 1 is a schematic diagram of the brushless repulsion motor to which the invention is directed, together with the inhibit markers of the present invention.
Figure 2:
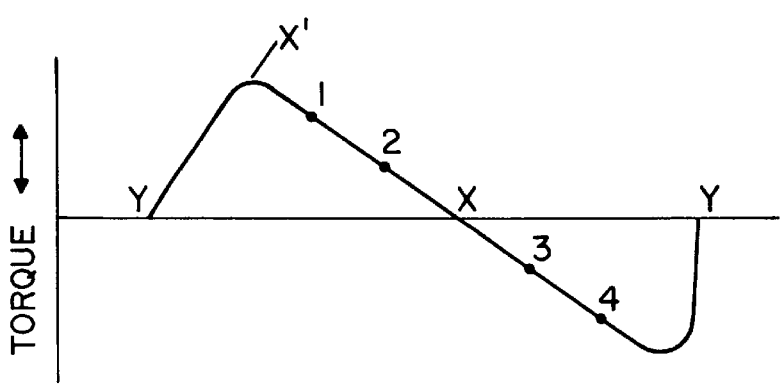
FIG. 2 is a torque curve for a brushless repulsion motor as shown in FIG. 1.
Figure 3:
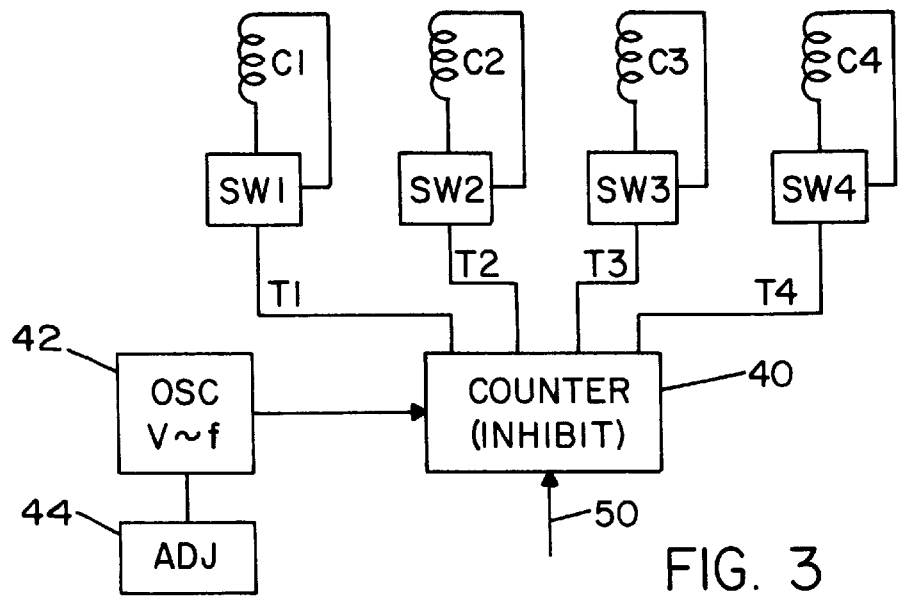
FIG. 3 is a schematic wiring diagram of the power switches and counter used in accordance with the preferred embodiment of the present invention.
Figure 6:
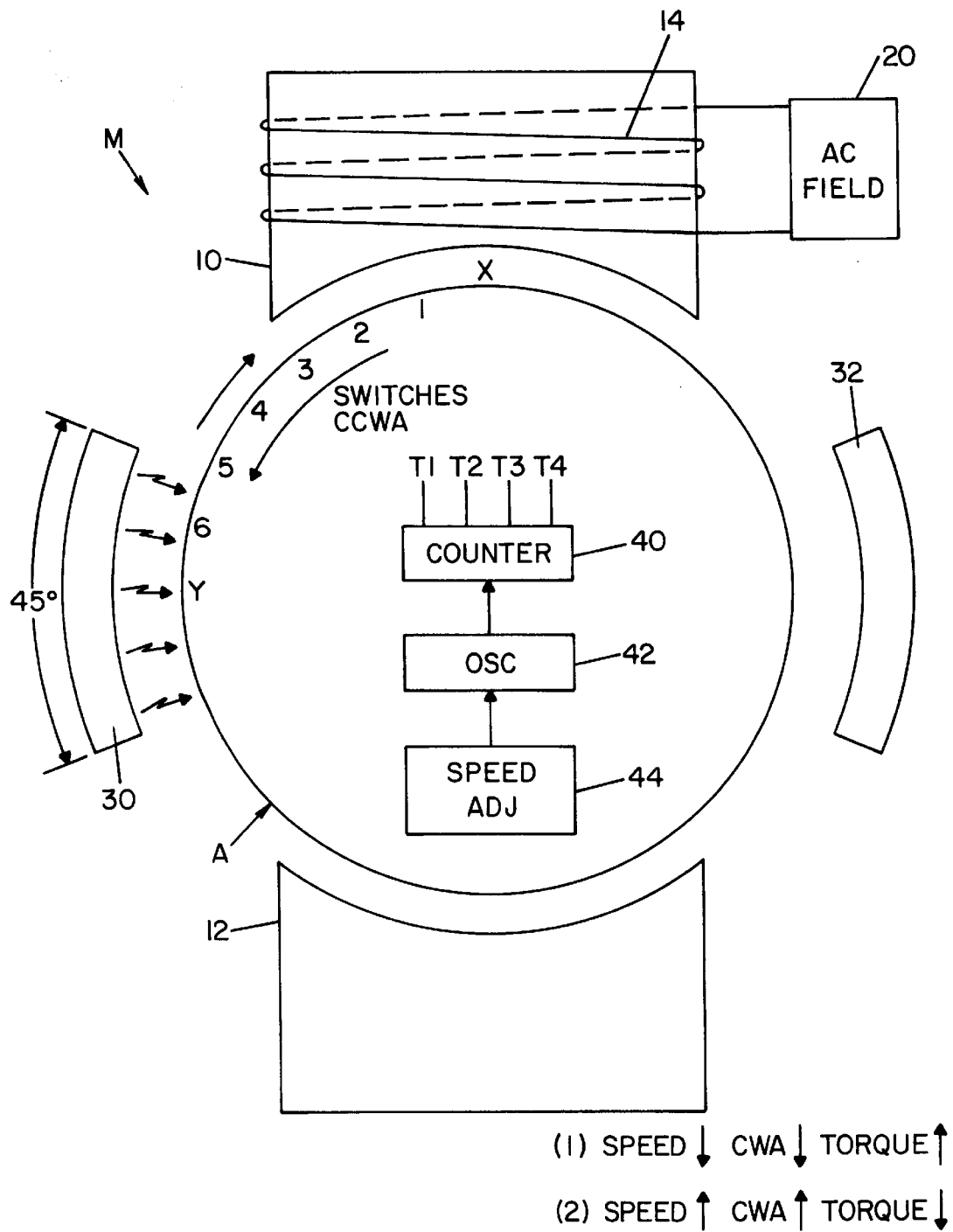
FIG. 6 is a general layout diagram of a brushless repulsion motor incorporating the present invention.
Figure 7:
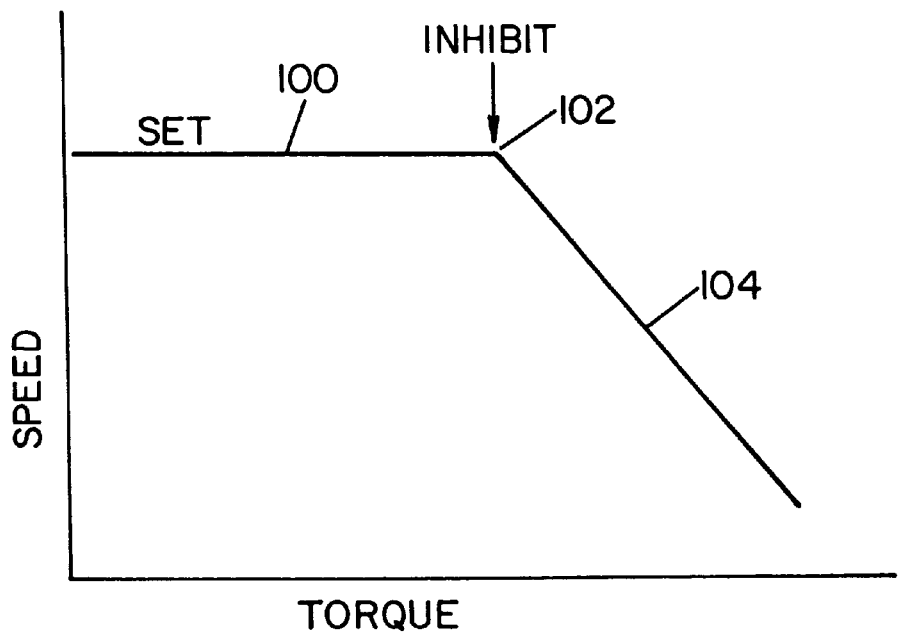
FIG. 7 is a speed/torque curve for a brushless repulsion motor operated in accordance with the present invention.
Figure 8:
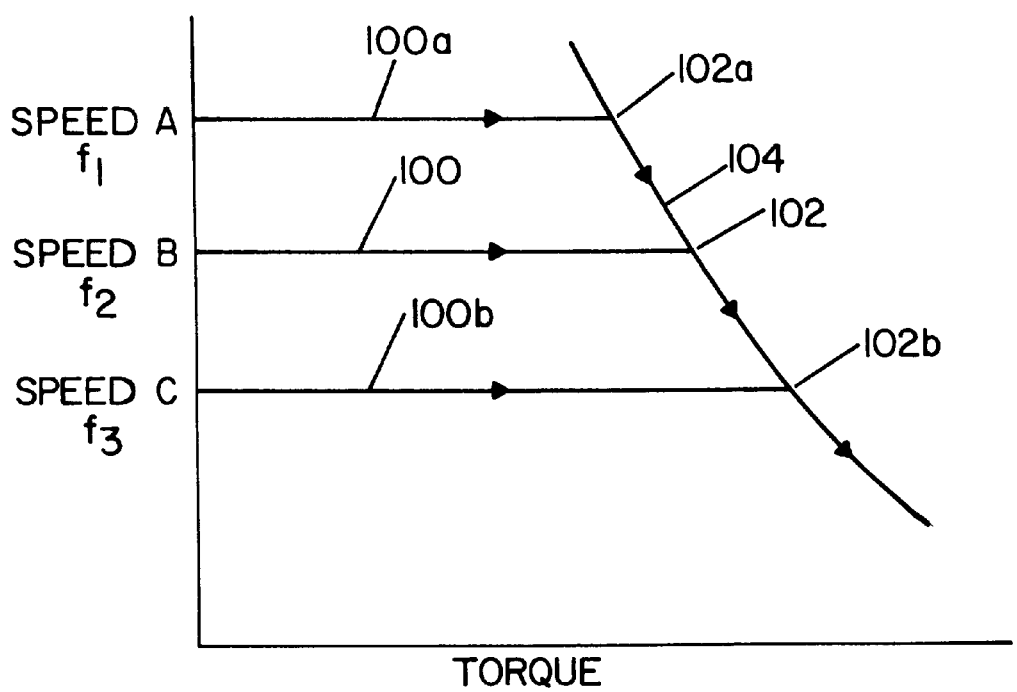
FIG. 8 is a curve similar to the curve shown in FIG. 7 illustrating the use of different frequencies to create different set speeds for the repulsion motor.

Referring now to the drawings, wherein the showing are for the purpose of illustrating preferred embodiments of the invention only and not for the purpose of limiting same, FIGS. 1, 2, 3 and 6 illustrate a brushless repulsion motor M with a rotating armature A having a field direction X created by diametrically opposed poles 10, 12 and a field winding 14, one of which is shown. A 60 Hz AC voltage from power line 20 creates the field along axis x between poles 10, 12 in accordance with standard motor technology. Of course a different frequency can be used. Circumferentially located coils C1–C4 are equally spaced around armature A. In the illustrated embodiment, four coils are employed for simplicity; therefore, the coils are spaced from each other 45° around the circumference of armature A. In the previously described example, eight coils were used which would provide a spacing of 22.5°. Each of the coils, as shown in Haner U.S. Pat. No. 5,686,805, are shorted by switch SW1–SW4 when the coils C1–C4 are in a preselected position with respect to field axis X. In Haner U.S. Pat. No. 5,684,805 the switches are closed by fixed markers located around the armature. These markers have an arcuate link of 45°, but they are not used to close the coil switching switches SW1–SW4. In the present invention, there are energy emitting markers 30, 32. Markers 30, 32 are employed for creating an inhibit signal, as will be explained later, when the maximum torque angle has been reached as schematically illustrated in FIG. 2, wherein the maximum torque angle X' in the clockwise direction is reached at about 22.5° from orthogonal zero torque position Y. This maximum torque point may range from 18° to 24° depending upon mechanical details of the stator. The 22.5° should not be confused with some element of the armature coil displacement. In accordance with the broadest aspect of the present invention, counter 40 driven by armature mounted oscillator 42 has an adjustable output frequency controlled by an armature mounted rheostat 44. The output of counter 40 is a succession of switch activating signals T1–T4 which are provided in sequence by the counter at the rate determined by the frequency of oscillator 42. Thus, the rate of cycling through switch closing signals T1–T4 is a fixed rate determined by the frequency from oscillator 42 as adjusted by rheostat 44. The operation of the speed control system and method utilizing the broadest concept of the invention is illustrated in FIGS. 1 and 6. Switch triggering signals in lines T1–T4 close successive switches that short, sequentially, the circumferentially spaced coils C1–C4, as best shown in FIG. 3. With this timing concept, by merely changing the frequency of oscillator 42, the rate of closing the switches SW1–SW4 to short coils C1–C4 controls the rotational speed of armature A. In this manner, the speed of the armature can be accurately controlled. However, when the load on armature A is such that the maximum torque angle has been reached, the motor will stall as illustrated by the graph in FIG. 2. To prevent this stalling action, in accordance with another aspect of the present invention, the speed control system shown in FIGS. 1, 2, 3 and 6 is modified to sense the maximum torque and then inhibit further counter clocking signals from oscillator 42 to counter 40. The oscillator output is blocked by the inhibit signal on line 50, which line is shown in FIG. 3. Upon reaching the maximum torque condition X', an inhibit signal is created in line 50 to prevent further sequencing of switch SW1–SW4 until the armature speed is reduced to allow increased torque. The reduced speed of the armature is now below the controlled speed determined by the normal frequency of the reference output pulse signal from oscillator 40. Upon reaching the maximum torque or torque angle, motor M is shifted into a different mode of operation. This is illustrated in FIGS. 7 and 8. The constant set speed 100 is maintained until the maximum torque causes the speed to droop slightly. This is set point 102. When the motor reaches this point, a constant speed can no longer be maintained. Thus, the oscillator inhibit condition exists. Thus a signal on line 50 inhibits the output of the oscillator 42 from entering counter 40. By using the present invention, the family of speed/torque curves illustrated in FIG. 8 can be employed by the brushless repulsion motor disclosed in Haner U.S. Pat. No. 5,686,805. When the frequency f, from oscillator 42 is employed, the set speed is increased from speed 100 to speed 100a. At the maximum torque angle 102a, the motor then operates along curve 104. In a like manner, to reduce the speed, frequency is reduced to frequency $f_3$ from the first speed $f_2$ to give a speed 100b. The inhibit point or maximum torque angle is at point 102b. Thus, the present invention is quite simple and easily applied to the existing brushless repulsion motor. By merely changing the frequency at the input of counter 40 the speed of the motor is controlled.

Figure 4:
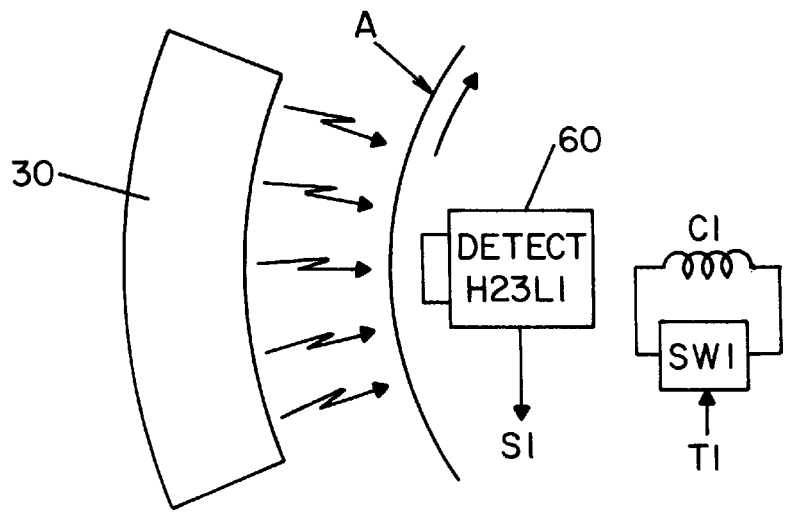
FIG. 4 is a partial wiring diagram and layout diagram showing the circuitry for creating an inhibit signal in accordance with an aspect of the invention.

To create an inhibit signal in line 50 to prevent the pulses from oscillator 42 from reaching the input of counter 40, the illustrated embodiment utilizes markers 30, 32 as previously described. The operation with respect to marker 30 will be described. This description applies equally to the counterclockwise marker 32. Operation of the inhibit circuit is best illustrated with respect to FIGS. 4 and 5. In FIG. 4, marker 30 transmits energy, i.e. light, magnet, etc. In the preferred embodiment, this energy is light from an array of LEDs. The energy signal is sensed by detector 60, which detector is aligned with position of coil C1. When detector 60 is opposite marker 30, signal S1 is created. If this signal occurs at the same time as signal T1 is directed to switch S1 to short coil C1, there is coincidence condition, which logic condition indicates maximum torque. An inhibit signal in line 50 then inhibits the output of oscillator 42 until there is lack of coincidence which will allow the oscillator to continue driving counter 40. A signal in line 50 causes the motor to operate along the portion 104 of the speed/torque curve as shown in FIGS. 7 and 8. When the maximum torque angle X' has been reached motor M operates on curve portion 104 until coincidence is removed. Armature A has increased its speed to reach maximum torque angle at point 102, 102a or 102b. This increase in speed along portion 104 is caused by a reduction in torque load on the armature.

The signal S1 shown in FIG. 4 is associated with coil C1. In a like manner, there is a detector 60 associated with each of the other coils C2–C4 to create a signal S2–S4 whenever the respective coils are aligned with marker 30. The same signals S1–S4 are created when detectors 60 pass marker 32, but there is no attempt to short coils C1–C4 at that negative portion when armature A is rotating in the clockwise direction. Of course, a second counter 40 with the sequence of signals T1–T4 being reversed is used if the motor is to be reversed in this embodiment of the invention. In that situation, marker 32 would become active and marker 30 would be ineffective. Both markers 30, 32 create signals S1–S4 regardless of the direction of rotation of the armature because only one photo detector 60 is associated with each coil. Each coil is activated twice per revolution of the armature. Thus, signals S1–S4 occur twice per revolution.

Figure 4A:
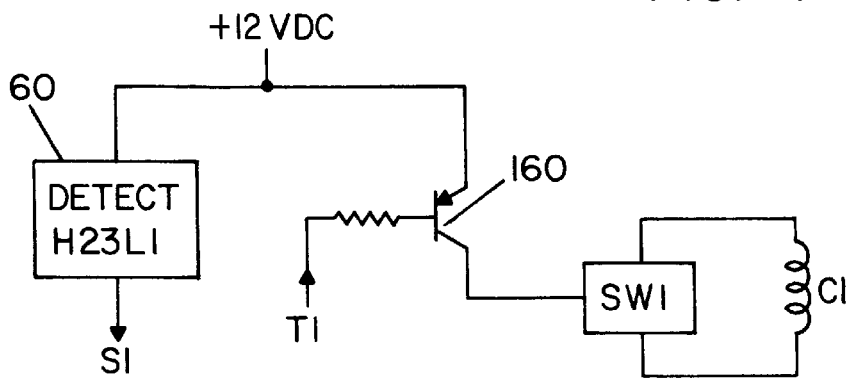
FIG. 4A is a view similar to FIG. 4 showing a circuit for closing the coil shorting switch and creating a detection signal for the circuit shown in FIG. 5.
Figure 5:
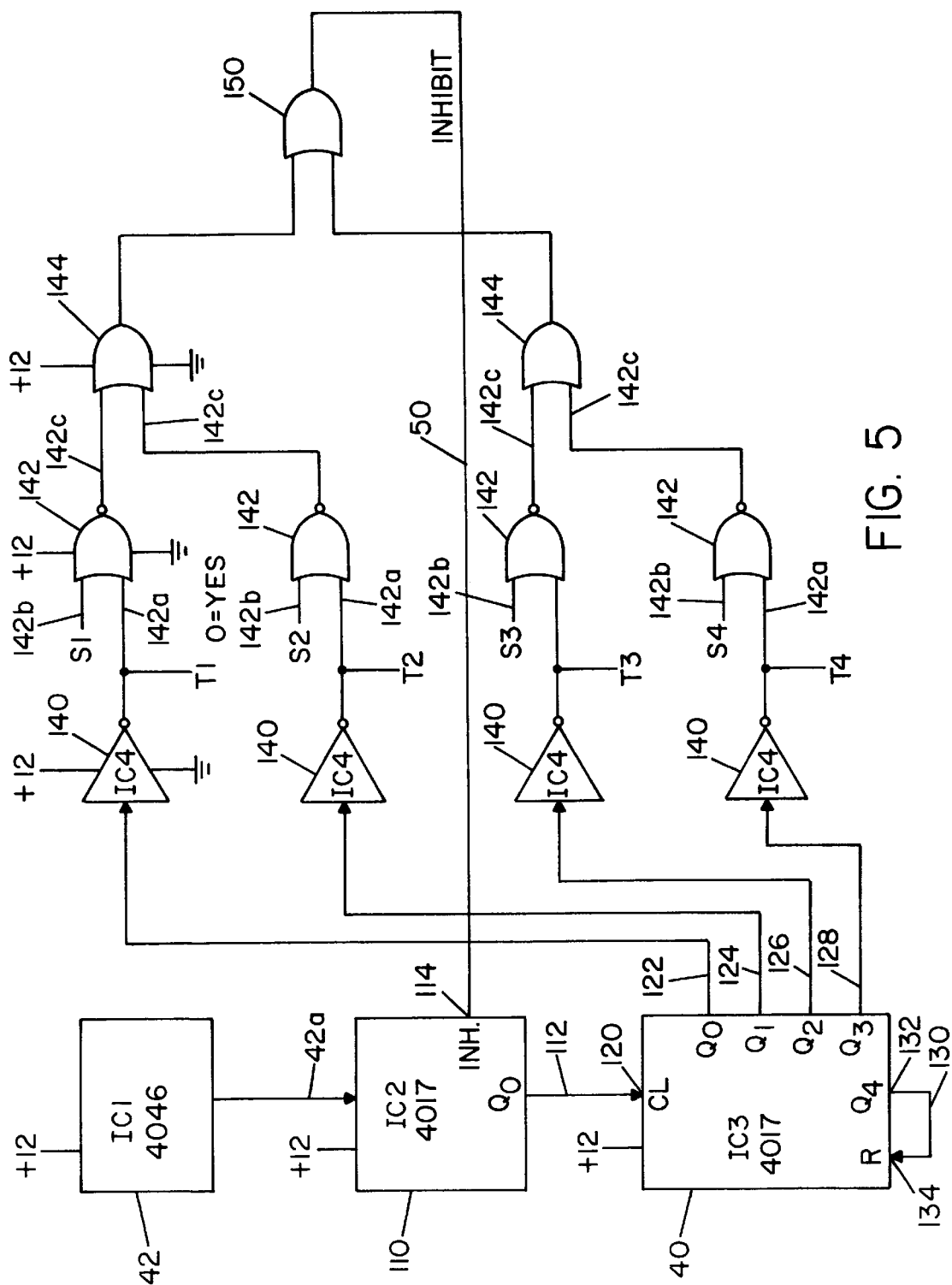
FIG. 5 is a wiring diagram of the circuit for practicing the preferred embodiment of the present invention.

The preferred coincidence circuit is illustrated in FIG. 5 wherein the output of oscillator 42 is a pulse signal referred to as the "reference signal", which signal appears in line 42a. The pulse signal or reference signal has a frequency determined by the voltage applied to v/f oscillator 42. Decade ring counter 110 creates output pulses on line 112 at a rate one tenth of the rate of pulses on line 42a. A logic 1 at inhibit terminal 114 blocks transfer of the signal on line 42a to the output line 112. The pulse frequency or reference frequency on line 112 clocks counter 40 which is a 10 state ring counter (4017) that creates switch triggering signals T1–T4 in sequence at lines 122–128. At state 5, counter 40 is reset by a signal at terminal 132 which is connected to reset terminal 134. Thus, counter 40 counts through signals T1–T4 and then repeats this sequencing. The logic 1 signal constituting the trigger pulse in lines 122–128 is inverted by invertors 140 to create the switch activating signals T1–T4. Signals T1–T4 are directed to the coincidence NOR gates 142 each of which has a second input from a detector 60. As shown in FIGS. 4 and 4A the detection signals are signals S1–S4. The output of gates 142 is a logic 0 unless there is a logic 0 on lines 142a and 142b. When there is a logic 0 on both of these lines, a switch is closed at the same time there is a detection by a detector 60. Logic 1 appears in output 142c. A logic 1 on any output 142c activates OR gate 144 to produce a logic 1 at the input of inhibit OR gate 150. Thus, a logic 1 appears at the output line 50 of gate 150 whenever there is a switch closing at the same time there is a detection by the corresponding detector 60 for the same coil. Thus, oscillator 42 controls the speed of armature A until the maximum torque angle has been reached. At this time, oscillator 42 no longer directs pulses to clock counter 40. This condition exists until there is no coincidence with a logic 0 on both inputs 142a, 142b of a gate 142. This inhibit signal reduces the speed according to the torque of the armature. FIG. 4A illustrates the actual circuits used to implement the concept described with respect to FIG. 4. Transistor 160 closes switch S1 upon receipt of a signal T1. Aligned with the coil C1 is detector 60 to create signal S1 by detection of an emitted energy from marker 30. The speed control system and method utilizing sequencing switch closing signals T1–T4 with the inhibit signal upon maximum torque is the basic system and method of the present invention.

Figure 9A:
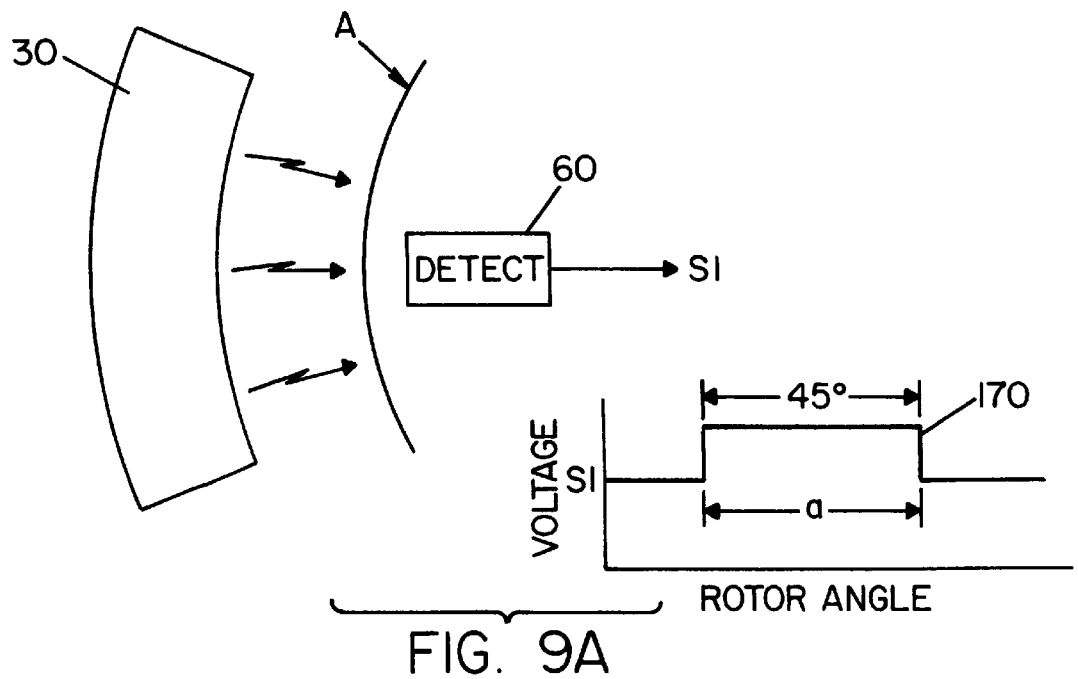
FIG. 9A is a partial layout drawing illustrating the detect circuit employed in one aspect of the present invention, together with a voltage curve of the detect signal created by the detect circuit.
Figure 9B:
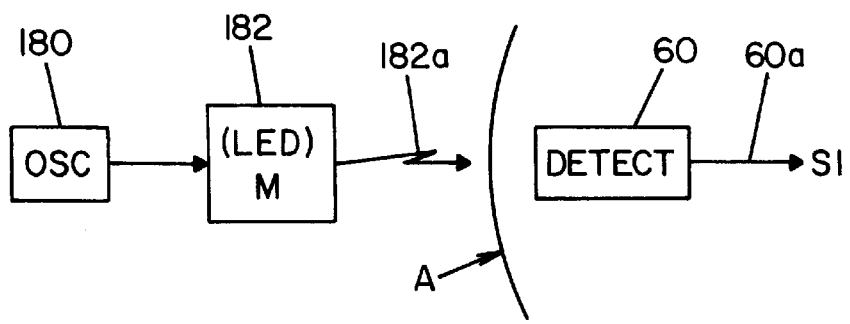
FIG. 9B is a block diagram illustrating a modification of the detect circuit, as shown in FIG. 9A, whereby the pulsating signal creating oscillator is external of the armature.
Figure 9C:
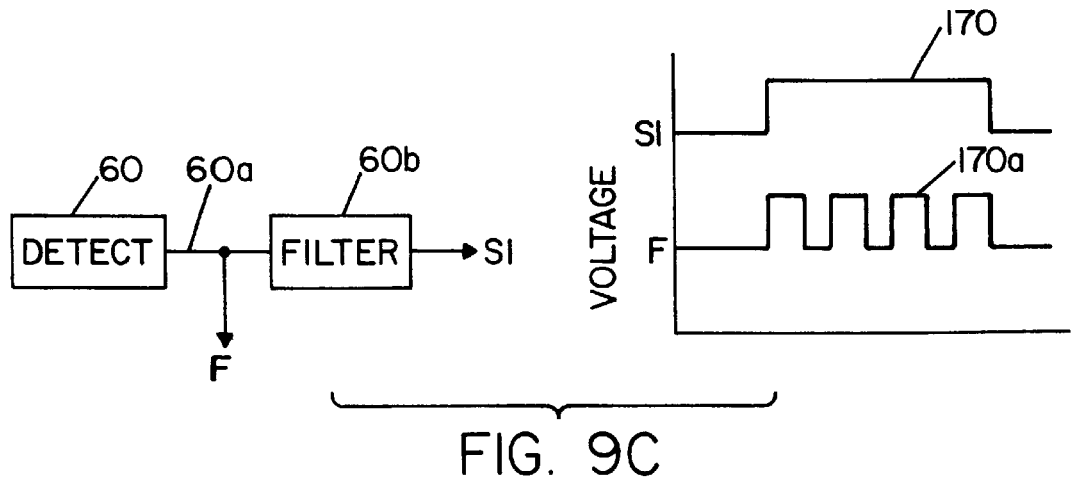
FIG. 9C is a block diagram illustrating a modification of the diagram shown in FIG. 9B used to create both a pulsating reference frequency F and a standard detect signal S1.
Figure 10:
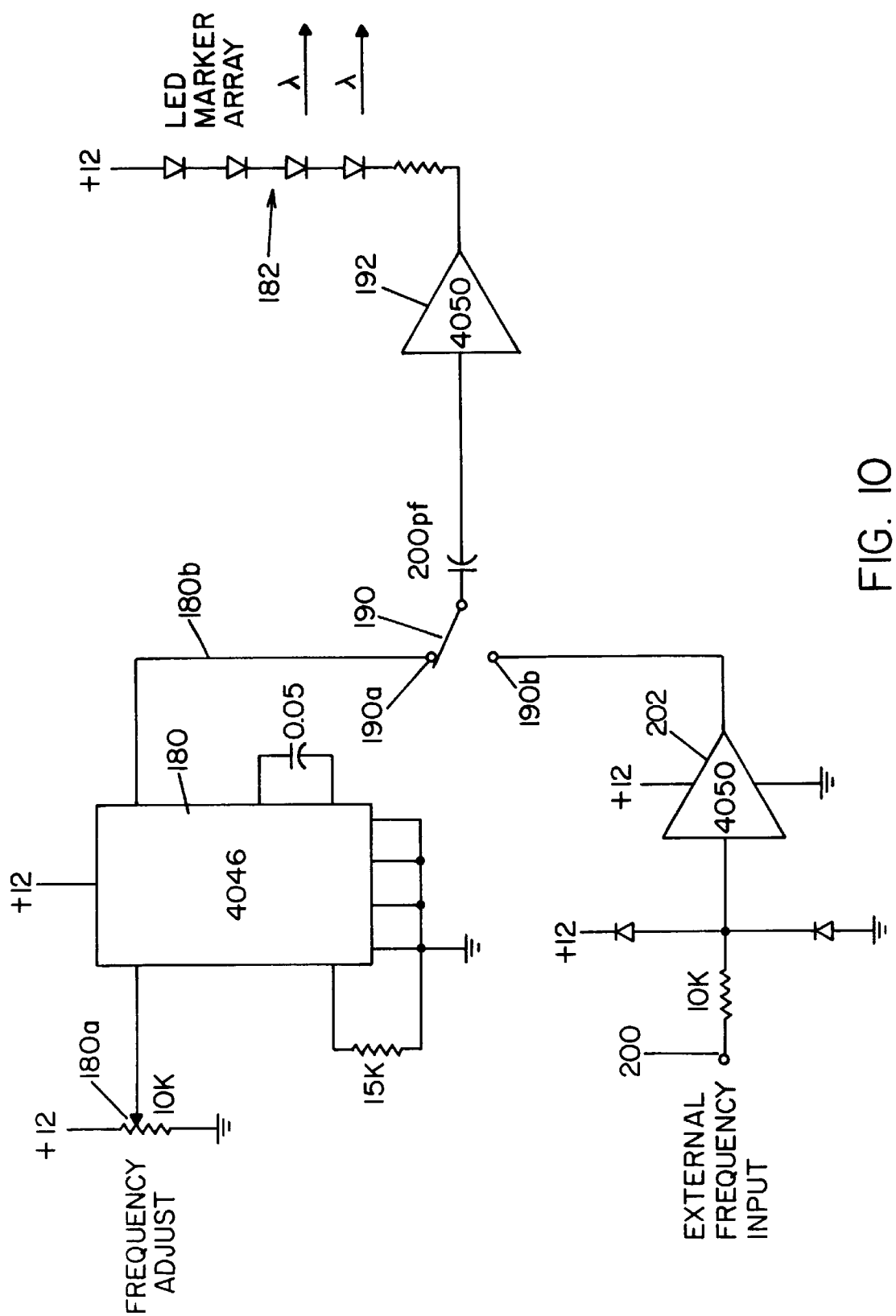
FIG. 10 is a wiring diagram of the remotely located reference signal circuit used in the preferred embodiment of the present invention to create a remotely generated reference frequency.
Figure 11:
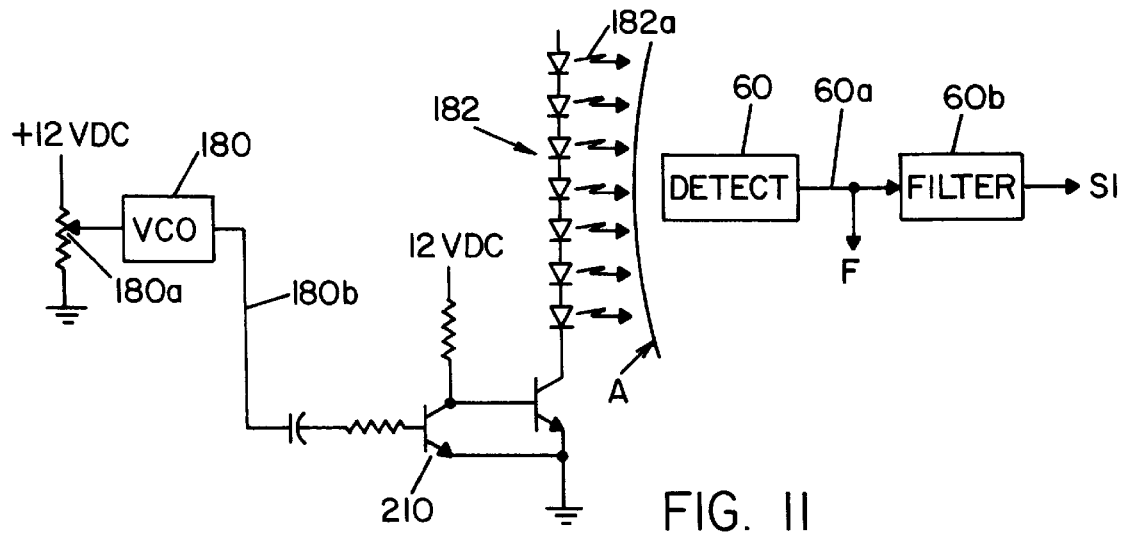
FIG. 11 is a schematic wiring diagram and detect circuit schematically illustrating the use of an aspect of the preferred embodiment of the invention as shown in FIG. 10.
Figure 12:
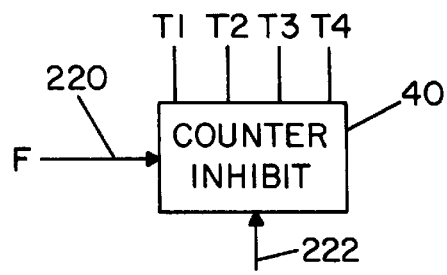
FIG. 12 is a block diagram of the counter used in the preferred embodiment of the present invention illustrating the switch triggering signals from the counter, together with the reference frequency input and the inhibit input to the counter.

The system and method of the present invention has involved the creation of a reference frequency from oscillator 42 for advancing counter 40 sequentially between signals T1–T4. Oscillator 42 is mounted on armature A; however, this presents an inconvenience since the armature must be stopped to change the frequency from the oscillator to change the speed 100 to a higher speed 100a or a lower speed 100b, as shown in FIG. 8. It is advantageous to create the reference frequency of the pulse signal to counter 40 externally of the armature so that it can be easily adjusted or coordinated with other equipment. In accordance with another aspect of the invention, the reference frequency or reference pulse signal for counter 40 is created external of the armature. This aspect of the invention is schematically illustrated in FIGS. 9A–9C. In FIG. 9A, detector 60, as previously explained, creates a signal 170 having an arcuate length a which length is 45° when four coils C1–C4 are used in motor M. Of course, with eight coils, the length is 22.5°. The illustration in FIG. 9A shows the creation of voltage signal 170 (S1) in accordance with the preferred embodiment of the present invention. A modification of this concept to have external creation of the count pulse rate is illustrated in FIGS. 9B and 9C. Remotely located fixed oscillator 180 drives marker 182 in the form of an LED array to create a signal 182a. Signal 182a is detected by previously described detector 60 which heretofore had only an output 60a on which signal S1 appears. This signal is voltage signal 170, as shown in FIG. 9A. Detector 60 as shown in FIG. 9C is operated so output 60a receives a pulsating signal determined by the pulsation of signal 182a from LED array 182 driven by oscillator 180. The pulsating signal F is shown in the lower graph of FIG. 9C, as voltage 170a. Pulsating signal F clocks counter 40 on armature A. Filters 60b convert pulsating signal 170a into a standard signal S1, as shown as upper voltage graph 170 in FIG. 9C. By using an external oscillator to drive marker 182, pulsating signal F is created external of the armature and is directed to the armature using the existing detectors 60, as previously described. The actual implementation of this aspect of the invention is illustrated in FIG. 10. Oscillator 180 has a frequency output in line 180b determined by the position of potentiometer 180a. Selector switch 190 has a position 190a causing output 180b, through amplifier 192, to drive LED marker array 182. The output of this array is a pulsating energy having a frequency determined by oscillator 180 and adjustable by potentiometer 180a. In this manner, counter 40 on the armature is driven at the frequency of oscillator 180, which oscillator can be easily adjusted external of motor M. With this arrangement, a second pulsating signal is connected to terminal 200. The signal is passed through amplifier 202 to selector switch 190. When the switch 190 is shifted to terminal 190b, the pulsating frequency at terminal 200 is used for counter 40 on armature A. Thus, v/f oscillator 180, which is a voltage controlled oscillator, provides an open loop control of counter 40. A signal from a microprocessor or other equipment, such as a second motor, can be used to control the speed of motor M by applying a signal having the desired synchronizing frequency on terminal 200. Array 182 is schematically illustrated in FIG. 11, wherein oscillator 180 drives Darlington switch 210. By using this aspect of the invention, counter 40 is operated at a speed determined by the signal F on input 220 as shown in FIG. 12. Inhibit line 222 is still generated on the armature. This signal stops pulses on line 220 by use of an internal gate such as a gate 110 shown in FIG. 5.

Figure 13:
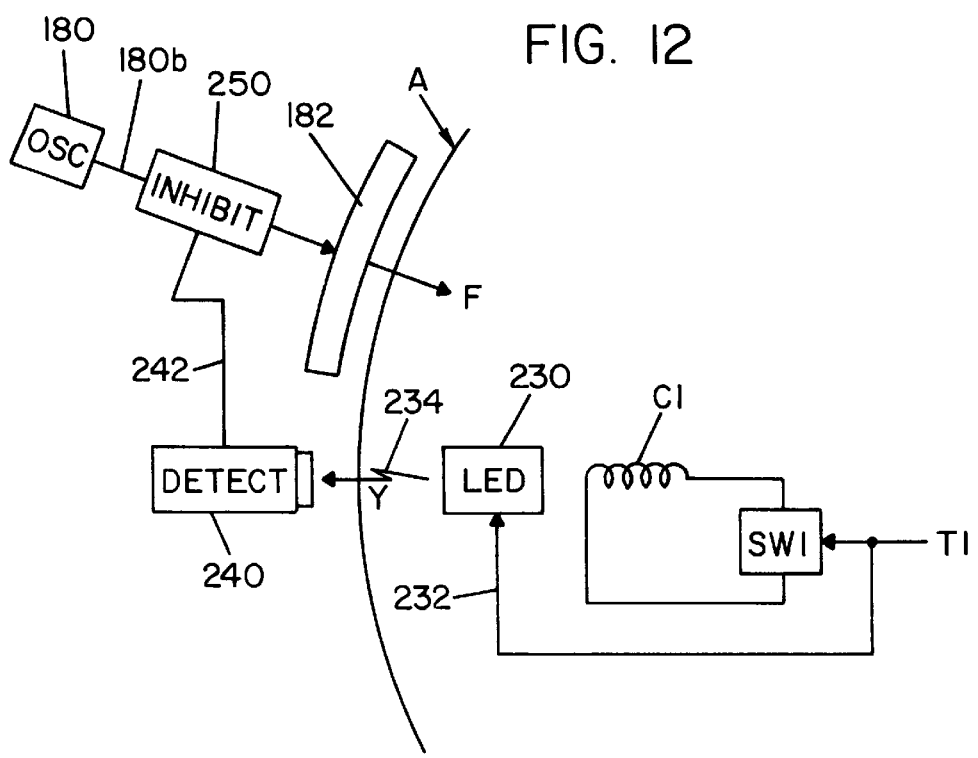
FIG. 13 is a block diagram schematically illustrating a modification of the preferred embodiment of the present invention wherein the oscillator is mounted external of the armature and also illustrating an external implementation of the preferred embodiment of the present invention.

As so far described, the counter and inhibit signal circuit of FIG. 5 are located on the armature. A further modification of the invention is illustrated in FIG. 13, wherein the inhibit signal is created in a different fashion and is used to inhibit pulses from external oscillator 180 on line 180b. In this implementation of the invention, an LED transmitter 230 is aligned with coil C1. When switch S1 is closed by signal T1, a signal in line 232 causes LED 230 to transmit an external energy source or light 234. An external detector 240, aligned with array 182, detects signal 234. When this signal is at the same location as marker array 182, detector 240 creates an inhibit signal in line 242 to activate inhibit gate 250, similar to gate 110 shown in FIG. 5. By using this modification of the present invention, the inhibit circuit as well as the oscillator is external of armature A. This modification of the invention allows adjustment of the counter frequency externally of the armature so there is no need for a potentiometer on the armature to adjust the speed of the motor. Marker array 182 allows simple implementation of the external oscillator concept.

Detectors 60 detect energy from marker 182. The marker is pulsated to create the frequency F used for counter 40 as shown in FIG. 9C. The pulse width of signal F can be very narrow and is approximately 5 microseconds. It has been found that the pulse rate of signal F can be in the range of 5 kHz–100 kHz representing a 20:1 adjustment speed range. Signal F can be easily filtered into signal 170 for use in the coincidence circuit of FIG. 5.

Figure 14:
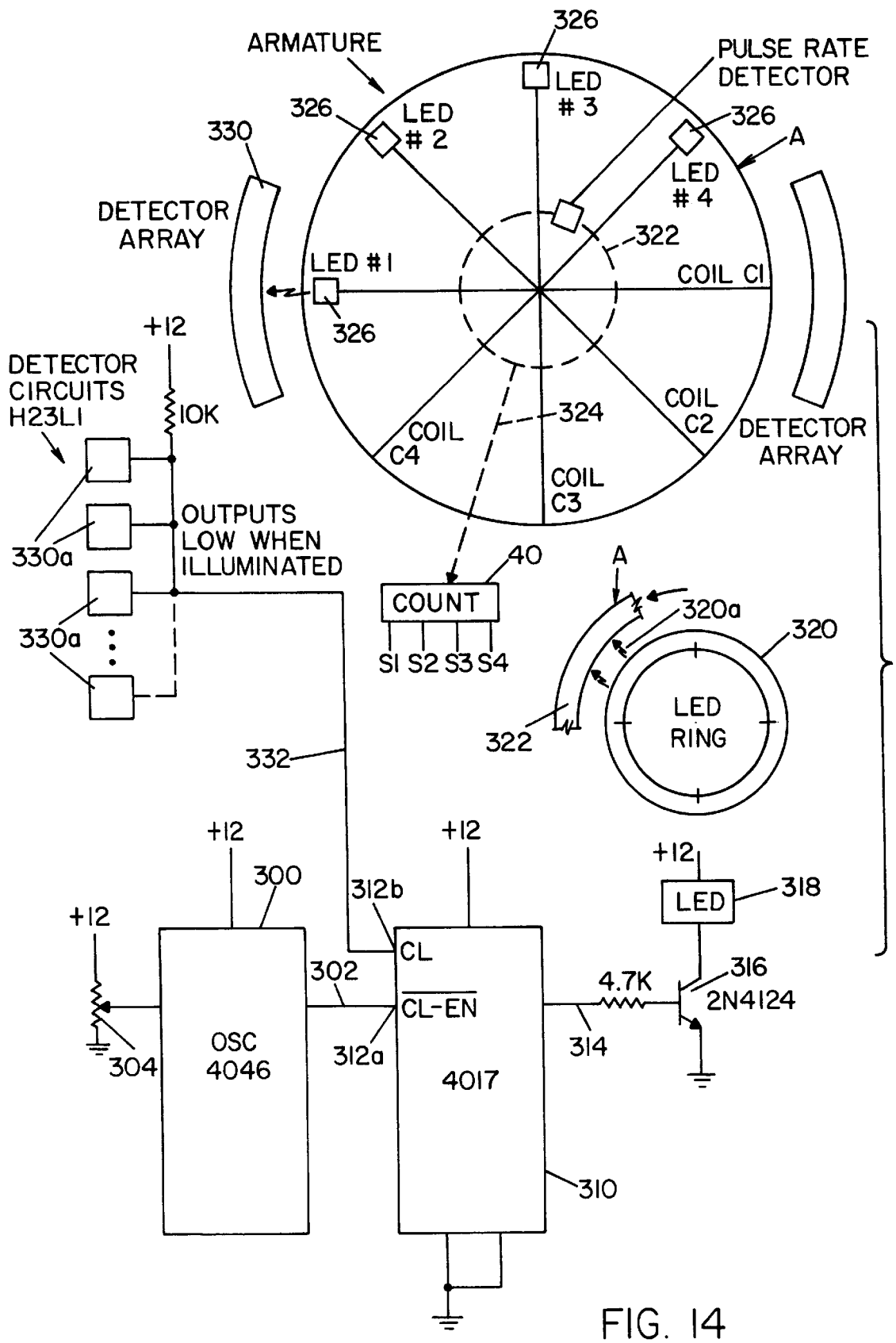
FIG. 14 is a schematic wiring diagram and partial view of the input transmission structure used in a modification of the preferred embodiment of the present invention.

A modification of the invention is illustrated in FIG. 14, wherein all of the circuits are remotely located, except for counter 40. In this embodiment of the invention, oscillator 300 has an output 302 with a pulsating signal having a frequency determined by the position of potentiometer 304. Output 302 is directed to the inhibit gate 310 in the form of a decade ring counter with count terminals 312a and 312b. With count pulses applied to terminal 312a a logic one on terminal 312b inhibits counting. Under normal circumstances, the pulses on line 302 of oscillator 300 pulse the output 314 to drive transistor 316 controlling the light-emitted frequency of LED 318 clustered in an array on LED ring 320, which is stationary with respect to armature A. Energy, in the form of light, indicated by lines 320a is transmitted to a rotating receiver ring or detector array 322 carried by armature A. Ring 322 creates output F in line 324 forming the input to counter 40 on armature A. Thus, the frequency of oscillator 300 is transmitted to rotating receiver ring 322 by ring 320 having a number of LEDs 318. Each of the coils C1–C4 has an LED 326 for directing an energy signal external of armature A. These signals are preferably light signals. These signals are detected by detector 330 in the form of an array of detectors 330a fixed at the desired location as marker 30, as previously described. Signals S1–S4 close the coil shorting switches and energize a LED 326 associated with the particular coil. If an LED is lighted when the LED is in the field of detector array 330, a signal appears on line 332 to provide a logic one at terminal 312b to inhibit counter 310. Thus, at maximum torque, LED transmitters 326 activate detector array 330 to inhibit the reference frequency from oscillator 300 to counter 40 by blocking oscillations through decade counter or gate 310. This embodiment of the invention operates in the same fashion as previously described, but has all of the components external of armature A, except the digital counter. Signal S1–S4 closes the armature switches SW1–SW4. These signals also drive one LED 326 associated with each switch SW1–SW4. The LEDs 326 are located on the armature at the same angular position as the corresponding coils C1–C4. Reference marker 30 is now a photodetector array 330 mounted on the stator in the position corresponding to the maximum torque angle, as previously described. Whenever a coil is activated in the maximum torque position, the LED transmitter 326 illuminates the stationary photodetector array 330, which in turn inhibits counter 310 to block the next pulse produced by oscillator 300.

Figure 15:
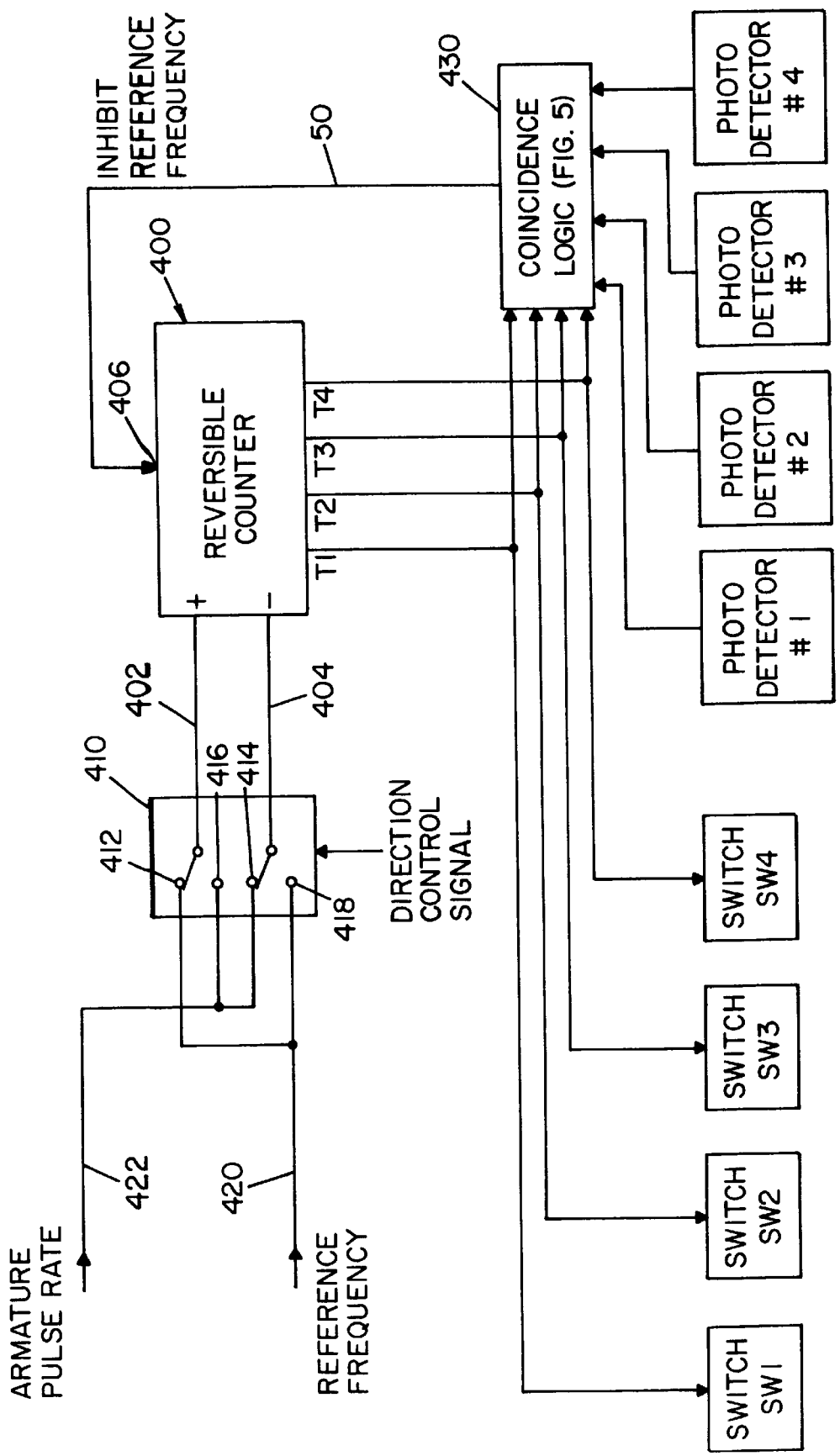
FIG. 15 is a block diagram showing a reverse up/down counter for practicing still a further embodiment of the present invention; and, FIG. 16 is a simplified block diagram illustrating the mechanism for obtaining a signal representative of the rotational speed of the armature.
Figure 16:
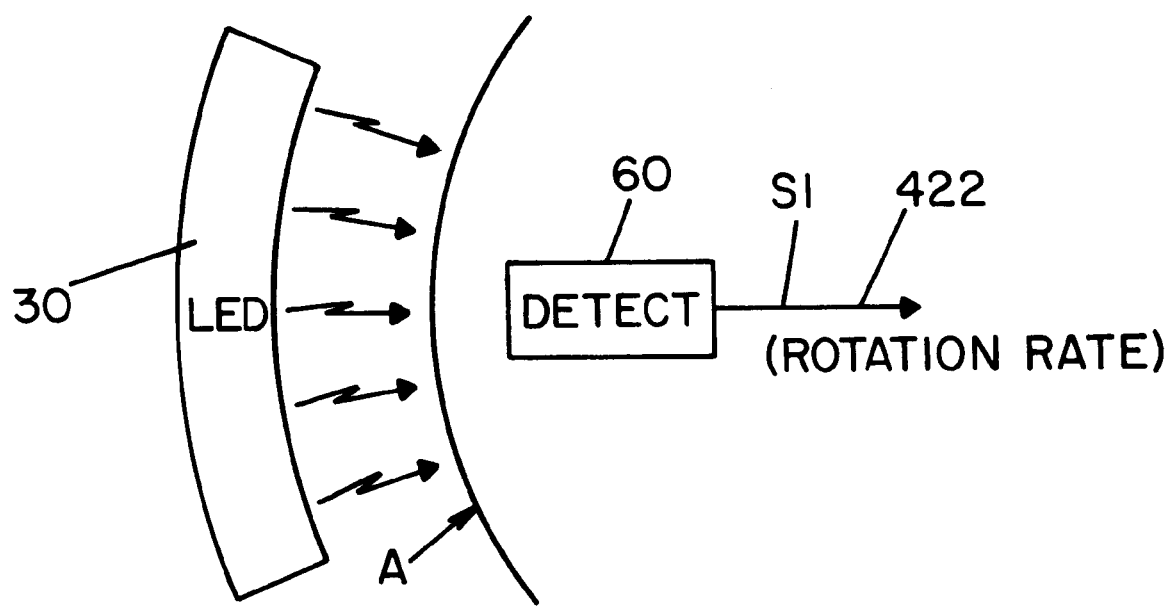

A further modification of the invention is illustrated in FIG. 15, wherein up/down counter 400 has an up count input 402 and a down count input 404. In this embodiment, a reference frequency is applied to one of the count inputs and an armature pulse rate is applied to the other input. Consequently, the rate of switch triggering signals T1–T4 is the difference between the reference frequency and a frequency representative of the rotational speed of the armature. The input frequencies, or pulsating signals, are directed to inputs 402, 404 by a double pole, double throw switch 410 having terminals 412, 414, 416 and 418. The pulsating signal on line 420 is the oscillator created reference signal, as previously described, except is has to be in the magnitude of twice the pulsating signal on line 422. The rotational representative signal on line 422 is created by the circuit shown in FIG. 16. A coincidence signal S1 is created by detector 60. In a like manner signals 52–54 are created. Since signals S1–S4 occur twice per revolution, eight pulses are applied to line 42 during each rotation of armature A. Switch 410 when in the position shown in FIG. 15, has the reference frequency directed to the up count input 402. The rotational speed representative signal 422 is directed to the down count input 404. The reference frequency 420 is set at a multiple of twice the rate of rotation signal on line 404. Since only the S1–S4 signals are used to create the armature speed signal in line 422, eight pulses are received by counter 40 during each rotation of armature A. By making the frequency on up count input 402, a multiple of twice the signal on line 422, the rate of rotation of the counter is equal to the rate of rotation of the armature. This is the regulated speed or synchronized speed of the motor. When the armature speed tends to decrease at the maximum torque angle, counter 400 will advance the switching to a coil position that is coincident with the previously described photodetector output. In that condition, the circuit logic in FIG. 5, shown as logic block 430 in FIG. 15, will create inhibit signal in line 50, as previously described. This signal will inhibit further pulses from line 420 until the coincidence condition disappears. The coincidence signal in line 50 will disappear when the armature speed is again synchronized. To reverse the direction of rotation of armature A, switch 410 is shifted to its second position with the reference signal on the down count input 404 and the armature speed signal on the up count 402. This will cause the sequence of signals T1–T4 to reverse. Referring now to FIG. 6, when operated in the first position, marker 30 become active. In the reverse position, marker 32 becomes active. When the armature is reversed, inhibit signal in line 50 will inhibit the reference frequency on down count input 404. A remotely controlled signal can be used for shifting the position of reversing switch 410. The use of a reversible counter control method is useful in an application that requires reversing the direction of rotation of the motor, such as the oscillating motion in a vertical tub washing machine. Of course, it is possible to use two separate counters 40, one operating in the clockwise direction and the other operating in the counter clockwise direction to allow reversal of armature A.

Having thus defined the invention, the following is claimed:

1. A speed control system for a brushless repulsion motor of the type including a series of armature mounted switches for shorting circumferentially spaced armature coils, said system comprising: a digital counter on said armature for creating a repetitive succession of switch activating signals in a selected sequence at a given rate determined by the counting rate of said counter; means for activating said switches with said signals in said sequence and at said rate to control the speed of said armature; and, means for directing a reference pulse signal at a reference frequency to said counter to set said counting rate of said counter.

2. A speed control system as defined in claim 1 wherein said counting rate is at said reference frequency.

3. A speed control as defined in claim 1 including means for creating a rotational pulse signal with a rotational frequency proportional to-the-speed of said armature and subtracting means for creating said counting rate as the difference between said reference frequency and said rotational frequency.

4. A speed control as defined in claim 3 wherein subtracting means is said counter wherein said counter is an up/down counter with an up count input and a down count input and said reference pulse signal being connected to one of said inputs and said rotational pulse signal being connected to said other input.

5. A speed control system as defined in claim 4 wherein said one input is said up count input.

6. speed control system as defined in claim 4 wherein said one input is said down count input.

7. A speed control system as defined in claim 4 including means for reversing said pulse signals with respect to said inputs to reverse the direction of rotation of said repulsion motor.

8. A speed control system as defined in claim 7 including means for changing said reference frequency of said reference pulse signal to change the set speed of said repulsion motor.

9. A speed control system as defined in claim 3 including means for changing said reference frequency of said reference pulse signal to change the set speed of said repulsion motor.

10. A speed control system as defined in claim 2 including means for changing said reference frequency of said reference pulse signal to change the set speed of said repulsion motor.

11. A speed control system as defined in claim 1 including means for changing said reference frequency of said reference pulse signal to change the set speed of said repulsion motor.

12. A speed control system as defined in claim 11 including a fixed remote means for creating said reference pulse signal.

13. A speed control system as defined in claim 12 wherein said remote means includes an oscillator and a signal transmitting device adjacent said armature for transmitting said reference pulse signal toward said armature and a detector on said armature for receiving said reference pulse signal.

14. A speed control system as defined in claim 12 wherein said remote means includes means for directing a synchronizing frequency signal to a signal transmitting device adjacent said armature for transmitting said reference pulse signal toward said armature and a detector on said armature for receiving said reference pulse signal.

15. A speed control system as defined in claim 2 including a fixed remote means for creating said reference pulse signal.

16. A speed control system as defined in claim 15 wherein said remote means includes an oscillator and a signal transmitting device adjacent said armature for transmitting said reference pulse signal toward said armature and a detector on said armature for receiving said reference pulse signal.

17. A speed control system as defined in claim 15 wherein said remote means includes means for directing a synchronizing frequency signal to a signal transmitting device adjacent said armature for transmitting said reference pulse signal toward said armature and a detector on said armature for receiving said reference pulse signal.

18. A speed control system as defined in claim 3 including a fixed remote means for creating said reference pulse signal.

19. A speed control system as defined in claim 18 wherein said remote means includes an oscillator and a signal transmitting device adjacent said armature for transmitting said reference pulse signal toward said armature and a detector on said armature for receiving said reference pulse signal.

20. A speed control system as defined in claim 18 wherein said remote means includes means for directing a synchronizing frequency signal to a signal transmitting device adjacent said armature for transmitting said reference pulse signal toward said armature and a detector on said armature for receiving said reference pulse signal.

21. A speed control system as defined in claim 4 including a fixed remote means for creating said reference pulse signal.

22. A speed control system as defined in claim 21 wherein said remote means includes an oscillator and a signal transmitting device adjacent said armature for transmitting said reference pulse signal toward said armature and a detector on said armature for receiving said reference pulse signal.

23. A speed control system as defined in claim 21 wherein said remote means includes means for directing a synchronizing frequency signal to a signal transmitting device adjacent said armature for transmitting said reference pulse signal toward said armature and a detector on said armature for receiving said reference pulse signal.

24. A speed control system as defined in claim 12 including a position signal emitting device fixed at a given position with respect to the rotation of said armature, a series of detectors with one of said detectors associated with each of said armature mounted coils, said detectors creating a coincidence signal when one of said detectors receives said position signal when its associate armature mounted coil is shorted; and, means for inhibiting said reference pulse signal to said counter upon creation of coincidence signal.

25. speed control system as defined in claim 11 including a position signal emitting device fixed at a given position with respect to the rotation of said armature, a series of detectors with one of said detectors associated with each of said armature mounted coils, said detectors creating a coincidence signal when one of said detectors receives said position signal when its associate armature mounted coil is shorted; and, means for inhibiting said reference pulse signal to said counter upon creation of coincidence signal.

26. A speed control system as defined in claim 10 including a position signal emitting device fixed at a given position with respect to the rotation of said armature, a series of detectors with one of said detectors associated with each of said armature mounted coils, said detectors creating a coincidence signal when one of said detectors receives said position signal when its associate armature mounted coil is shorted; and, means for inhibiting said reference pulse signal to said counter upon creation of coincidence signal.

27. A speed control system as defined in claim 9 including a position signal emitting device fixed at a given position with respect to the rotation of said armature, a series of detectors with one of said detectors associated with each of said armature mounted coils, said detectors creating a coincidence signal when one of said detectors receives said position signal when its associate armature mounted coil is shorted; and, means for inhibiting said reference pulse signal to said counter upon creation of coincidence signal.

28. A speed control system as defined in claim 4 including a position signal emitting device fixed at a given position with respect to the rotation of said armature, a series of detectors with one of said detectors associated with each of said armature mounted coils, said detectors creating a coincidence signal when one of said detectors receives said position signal when its associate armature mounted coil is shorted; and, means for inhibiting said reference pulse signal to said counter upon creation of coincidence signal.

29. A speed control system as defined in claim 3 including a position signal emitting device fixed at a given position with respect to the rotation of said armature, a series of detectors with one of said detectors associated with each of said armature mounted coils, said detectors creating a coincidence signal when one of said detectors receives said position signal when its associate armature mounted coil is shorted; and, means for inhibiting said reference pulse signal to said counter upon creation of coincidence signal.

30. A speed control system as defined in claim 2 including a position signal emitting device fixed at a given position with respect to the rotation of said armature, a series of detectors with one of said detectors associated with each of said armature mounted coils, said detectors creating a coincidence signal when one of said detectors receives said position signal when its associate armature mounted coil is shorted; and, means for inhibiting said reference pulse signal to said counter upon creation of coincidence signal.

31. A speed control system as defined in claim 1 including a position signal emitting device fixed at a given position with respect to the rotation of said armature, a series of detectors with one of said detectors associated with each of said armature mounted coils, said detectors creating a coincidence signal when one of said detectors receives said position signal when its associate armature mounted coil is shorted; and, means for inhibiting said reference pulse signal to said counter upon creation of coincidence signal.

32. A speed control system as defined in claim 31 including means for reversing the counting direction of said digital counter to reverse the direction of said repulsion motor.

33. A speed control system as defined in claim 9 including means for reversing the counting direction of said digital counter to reverse the direction of said repulsion motor.

34. A speed control system as defined in claim 10 including means for reversing the counting direction of said digital counter to reverse the direction of said repulsion motor.

35. A speed control system as defined in claim 11 including means for reversing the counting direction of said digital counter to reverse the direction of said repulsion motor.

36. A speed control system as defined in claim 2 including means for reversing the counting direction of said digital counter to reverse the direction of said repulsion motor.

37. A speed control system as defined in claim 1 including means for reversing the counting direction of said digital counter to reverse the direction of said repulsion motor.

38. A speed control method for a brushless repulsion motor of the type including a series of armature mounted switches for shorting circumferentially spaced armature coils, said method comprising:
   (a) creating a repetitive succession of switch activating signals in a selected sequence at a given rate; and
   (b) activating said switches with said signals in said sequence and at said rate to control the speed of said armature.

39. A speed control method as defined in claim 38 including the additional step of changing said given rate to change the set speed of said repulsion motor.

40. A speed control method as defined in claim 38 including the additional steps of
   (c) creating a coincidence signal when one of said armature mounted coils is shorted at a given position; and, inhibiting said switch activating signals upon creation of coincidence signal.

41. A speed control method as defined in claim 40 including the additional step of reversing direction of said sequence of said signals to reverse the direction of said repulsion motor.

42. A speed control method as defined in claim 39 including the additional step reversing direction of said sequence of said signals to reverse the direction of said repulsion motor.

43. A speed control method as defined in claim 38 including the additional step of reversing direction of said sequence of said signals to reverse the direction of said repulsion motor.

44. A speed control system for a brushless repulsion motor of the type including a series of armature mounted switches for shorting circumferentially spaced armature coils, said system comprising: means for creating a repetitive succession of switch activating signals in a selected sequence at a given rate; and, activating said switches with said signals in said sequence and at said rate to control the speed of said armature.

45. A speed control system as defined in claim 44 including means for sensing a decrease in said armature speed below said controlled speed and means for inhibiting said signals upon said sensed decrease.

46. A speed control system as defined in claim 44 including means for changing said given rate to change said armature speed.

47. A speed control system as defined in claim 46 wherein said signal creating means is a digital counter counting at the rate of the frequency of an input pulse signal and said rate changing means includes an oscillator for creating said input pulse signal at a frequency controlled by the voltage at the input of said oscillator.

48. A speed control system as defined in claim 44, including means for reversing the sequence of said signals to reverse the direction of said repulsion motor.

49. A speed control system for a brushless repulsion motor of the type including a series of armature mounted switches for shorting circumferentially spaced armature coils, said system comprising: a digital up/down counter on said armature for creating a repetitive succession of switch activating signals in a selected sequence, said counter having an up count input and a down count input; means for activating said switches with said signals in said sequence; and, means for directing a reference pulse signal at a reference frequency to one input of said counter and a rotational pulse signal at a frequency controlled by the speed of said armature with the difference in said pulse signals used to set said counting rate of said counter and thus the speed of said armature.

50. A speed control as defined in claim 49 with means for adjusting said reference frequency to change the speed of said armature.

51. A speed control as defined in claim 50 including means for reversing the inputs of said pulse signals to reverse the direction of said armature.

52. A speed control as defined in claim 51 including means for inhibiting said reference pulse signal when said armature experiences a high torque.

53. A speed control as defined in claim 52 wherein said high torque is a maximum torque.

54. A speed control as defined in claim 49 including means for reversing the inputs of said pulse signals to reverse the direction of said armature.

55. A speed control as defined in claim 54 including means for inhibiting said reference pulse signal when said armature experiences a high torque.

56. A speed control as defined in claim 55 wherein said high torque is a maximum torque.

57. A speed control as defined in claim 49 including means for inhibiting said reference pulse signal when said armature experiences a high torque.

58. A speed control as defined in claim 57 wherein said high torque is a maximum torque.

\* \* \* \* \*